(12) United States Patent
Piry et al.

(10) Patent No.: US 8,738,971 B2
(45) Date of Patent: May 27, 2014

(54) LIMITING CERTAIN PROCESSING ACTIVITIES AS ERROR RATE PROBABILITY RISES

(75) Inventors: Frederic Claude Marie Piry, Cagnes-sur-Mer (FR); Luca Scalabrino, Biot (FR); David Michael Bull, Balsham (GB)

(73) Assignee: ARM Limited, Cambridge (GB)

( * ) Notice: Subject to any disclaimer, the term of this patent is extended or adjusted under 35 U.S.C. 154(b) by 283 days.

(21) Appl. No.: 13/313,057

(22) Filed: Dec. 7, 2011

(65) Prior Publication Data

US 2013/0151891 A1    Jun. 13, 2013

(51) Int. Cl.
    *G06F 11/00*    (2006.01)
(52) U.S. Cl.
    USPC .............. 714/47.2; 714/22; 714/30; 714/47.1
(58) Field of Classification Search
    USPC .............. 714/22, 25, 30, 33, 37, 39, 41, 47.1, 714/47.2, 47.3
    See application file for complete search history.

(56) References Cited

U.S. PATENT DOCUMENTS

| | | | |
|---|---|---|---|
| 6,230,262 B1 | 5/2001 | Witt | |
| 6,981,261 B2 | 12/2005 | Kalafatis et al. | |
| 7,127,592 B2 | 10/2006 | Abraham et al. | |
| 7,447,919 B2 * | 11/2008 | Liepe et al. | 714/47.2 |
| 7,475,320 B2 * | 1/2009 | Knebel et al. | 714/47.2 |
| 7,493,516 B2 * | 2/2009 | Ferren et al. | 714/30 |
| 2004/0078660 A1 * | 4/2004 | Farwell | 714/22 |
| 2006/0200699 A1 * | 9/2006 | Flautner et al. | 714/25 |

OTHER PUBLICATIONS

Bowman et al., "A 45 nm Resilient Microprocessor Core for Dynamic Variation Tolerance", *IEEE Journal of Solid-State Circuits*, vol. 46, No. 1, Jan. 2011, pp. 194-208.
Tsuchanz et al., "Adaptive Frequency and Biasing Techniques for Tolerance to Dynamic Temperature-Voltage Variations and Aging", *ISSCC 2007*, Session 16, 16.4, 2007, pp. 292-293 & 604.
Blaauw et al., "Razor II: In Situ Error Detection and Correction for PVT and SER Tolerance", ISSCC 2008, Session 22, 22.1, 2008, pp. 400-401 & 622.
Bowman et al., "Energy-Efficient and Mestability-Immune Timing-Error Detection and Instruction-Replay Based Recovery Circuits for Dynamic-Variation Tolerance", *ISSCC 2008*, Session 22, 22.2, 2008, pp. 402-403 & 623.
Nicoladis et al., "A Generalized Theory of Fail-Safe Systems", *IEEE*, 1998, pp. 398-406.

(Continued)

*Primary Examiner* — Joseph D Manoskey
(74) *Attorney, Agent, or Firm* — Nixon & Vanderhye P.C.

(57) ABSTRACT

A data processing apparatus configured to operate in a voltage and frequency operating region that is located beyond a safe region where errors do not arise, but within operating region limits such that the errors are rare. The data processing apparatus comprises: error detection circuitry and error recovery circuitry; the error detection circuitry being configured to determine if a signal sampled in the processing apparatus changes within a time window occurring after the signal has been sampled and during a same clock cycle as the sampling and to signal an error if the signal does change. The data processing apparatus further comprises performance control circuitry configured to determine when the data processing apparatus is operating close to the operating region limits where an error rate is raised and in response to determining operation close to the operating region limits to modify a behavior of the data processing apparatus by at least one of: limiting speculative processing, and selecting timing insensitive processing paths and circuitry.

20 Claims, 8 Drawing Sheets

(56) References Cited

OTHER PUBLICATIONS

Floros et al., "A Pipeline Architecture Incorporating Low-Cost Error Detection and Correction Mechanism", *IEEE*, 2006, pp. 692-695.

Bull et al., Corrections to "A Power-Efficient 32 bit ARM Processor Using Timing-Error Detection and Correction for Transient-Error Tolerance and Adaptation to PVT Variation", *IEEE Journal of Solid-State Circuits*, vol. 46, No. 3, Mar. 2011, p. 705.

Lubaszewski et al., "A Reliable Fail-Safe System", IEEE Transactions on Computers, vol. 47, No. 2, Feb. 1998, pp. 236-241.

Meixner et al., "Argus: Low-Cost, Comprehensive Error Detection in Simple Cores", *40th IEEE/ACM Intl. Symposium on Microarchitecture*, 2007, pp. 210-222.

Das et al., "A Self-Tuning DVS Processor Using Delay-Error Detection and Correction", *IEEE Journal of Solid-State Circuits*, vol. 41, No. 4, Apr. 2006, pp. 792-804.

Das et al., "A Self-Tuning DVS Processor Using Delay-Error Detection and Correction", *2005 Symposium on VLSI*, 17.1, 2005, pp. 258-261.

Tsiatouhas et al., "A Sense Amplifier Based Circuit for Concurrent Detection of Soft and Timing Errors in CMOS ICs", *9th IEEE Int'l. Online Testing Symposium*, 2003, 5 pages.

Agarwal et al., "Circuit Failure Prediction and Its Application to Transistor Aging", *25th IEEE VLSI Test Symposium*, 2007, 8 pages.

Anghel et al., "Cost Reduction and Evaluation of a Temporary Faults Detecting Technique", No Date, 8 pages.

Nomura et al., "Delay and Power Monitoring Schemes for Minimizing Power Consumption by Means of Supply and Threshold Voltage Control in Active and Standby Modes", *IEEE Journal of Solid-State Circuits*, vol. 41, No. 4, Apr. 2006, pp. 805-814.

Raahemifar et al., "Design-for-Testability Techniques for Detecting Delay Faults in CMOS/BiCMOS Logic Families", *IEEE Transactions on Circuits and Systems*, vol. 47, No. 11, Nov. 2000, pp. 1279-1290.

M. Nicoladis, "Efficient Implementations of Self-Checking Adders and Alus", *IEEE*, 1993, pp. 586-595.

\* cited by examiner

LIMITING CERTAIN PROCESSING ACTIVITIES AS ERROR RATE PROBABILITY RISES

TECHNICAL FIELD

The technical field relates to the field of data processing and in particular, to data processors that operate in an unsafe region where errors may occur although they are rare.

BACKGROUND

Generally data processing apparatus are tuned to operate within safe limits to such that the voltage level and clocking frequency are held at levels where errors should not occur. This requires a safe limit to be built into these parameters so that no errors occur for any corner cases during a reasonable length of lifetime of the device. An alternative approach is provided by a razor-based system produced by ARM® Limited of Cambridge England. This is a system that is designed to operate at a point beyond this estimated absolute safe limit. The system has an error detection and recovery means to recover from cases where the signal does not reach the output in time. This system has a speculation region at the end of the clock cycle during which the output signal is measured to see if it is stable. Thus, provided any output signal attains its final value within this region, this will be detected, and if this final value is not the value at the end of the clock cycle, this can be determined and corrected. As it has this error detecting and correcting capability, the system does not need to put in the usual safety margins. In effect it can tune its operational voltage and/or frequency to be in a range where errors are unlikely but may occur.

Although this has the advantage of not requiring safety margins, clearly the operating region must be limited to some extent as if errors become too frequent then any savings due to operating beyond conventional safety margins are outweighed by the additional time and power required to recover from the errors. These razor systems may therefore be built with operating limits but these limits occur in a region where errors may occur but are rare.

It would be desirable to be able to limit the frequency of errors and the costs of recovering from them.

SUMMARY

A first aspect provides a data processing apparatus for processing data, said data processing apparatus being configured to operate in a voltage and frequency operating region that is located beyond a safe region where errors do not arise, but within operating region limits such that said errors are rare, said data processing apparatus comprising: error detection circuitry and error recovery circuitry; said error detection circuitry being configured to determine if a signal sampled in said processing apparatus changes within a time window occurring after said signal has been sampled and during a same clock cycle as said sampling and to signal an error if said signal does change; said data processing apparatus comprising performance control circuitry configured to determine when said data processing apparatus is operating close to said operating region limits such that an error rate is raised and in response to determining operation close to said operating region limits to modify a behaviour of said data processing apparatus by at least one of: limiting speculative processing, and selecting timing insensitive processing paths and circuitry.

The technology described herein recognises that while operation may still be safe where errors are occurring in a system that can recover from errors, if too many errors occur then the costs of recovery from these errors will be high. It also recognises that when the apparatus is operating within an acceptable operation region, where it nears the limits to this region then the error rate will increase. Thus, it may be advantageous to detect when this is the case and modify the behaviour of the data processing apparatus to try to limit the costs of error recovery and/or the number of errors. In this regard it is noted that where there is speculative processing, then any error occurring within this speculation will require the whole speculative process to be replayed, and thus, if it is determined that error rates may be raised, it may be convenient to limit speculation to limit replay costs. It should also be noted that speculative processes are often both timing critical and power hungry and thus, limiting the amount of speculation may not only improve the error recovery costs but may also reduce error rates.

It may also be advantageous to select timing insensitive processing paths and circuitry where there is a choice. Thus, for example if a task is scheduled such as a multiply accumulate that is timing sensitive and uses timing sensitive circuitry, it may be advantageous when operating near the operating region limits to choose to perform this task in a non timing sensitive way using non-timing sensitive circuitry by dividing the task into a multiply and add task. These tasks may take longer to perform but are less likely to fail and again will consume less power which may help move the data processing apparatus away from the limit of the operating region.

In some embodiments said data processing apparatus comprises an error controller configured to receive error signals from said error detection circuitry indicating that an error has been detected, said error controller being configured to determine when a rate of detected errors rises above a predetermined value and to signal an increased error rate to said performance control circuitry, said performance control circuitry determining that said data processing apparatus is operating close to said operating region limits in response to receiving said increased error rate signal.

The performance control circuitry may determine that the data processing apparatus is operating close to the operating region limits in a number of ways, but one effective way is to determine when a rate of detected errors rises above a predetermined value. As the errors need to be detected to allow for error recovery the detecting circuitry is already present in the apparatus. Thus, using this circuitry to generate a signal indicating where in the operating region the data processing apparatus is operating is both effective and area efficient.

In some embodiments, said error detection circuitry is configured to detect errors in signals on processing critical paths and on non-critical performance improvement paths and to transmit said error signals to said error controller, said error recovery circuitry being configured to perform error recovery only in response to said error signals on said processing critical paths, and said error controller being configured to count all detected error signals when determining said error rate.

Data processing apparatus may have error detection circuitry for detecting errors that occur throughout the apparatus. However, where these errors occur within non-critical performance improvement paths such as in branch prediction or prefetch then they do not need to be corrected for as errors occurring here will not affect the data output, it will only affect the performance and correcting these errors will have a performance hit itself. However, these errors are indicative of where in the operating region the data processing apparatus is operating and thus, it is advantageous if these errors are counted along with the errors that are corrected when determining the error rate.

In some embodiments, said performance control circuitry is configured to monitor an operating frequency, current temperature and operating voltage of said data processing apparatus and to determine that said data processing apparatus is operating close to said operating region limits in response to detecting a current operating frequency, temperature and voltage that are close to said operating frequency, temperature and voltage of said operating region limits.

An alternative way of determining where the data processing apparatus is operating in the operating region is to measure the temperature, voltage and frequency of operation. These parameters affect the speed that devices can operate and thus, the error rate produced. Thus, measuring these may provide a good indication of where in the operating region the data processing apparatus is currently operating.

In some embodiments, said performance control circuitry is configured to monitor a replica critical path and to determine from a timing of a signal along said replica critical path when said data processing apparatus is operating close to said operating region limits.

An alternative way of determining when the data processing apparatus is operating close to the operating region limits is to build a replica critical path and to monitor signals sent along it. If the signal does not reach the end of the path within a clock cycle then this is a good indication that other real critical paths within the data processing apparatus will also not be meeting timing constraints. Thus, a replica critical path that is designed with the appropriate delay characteristics can provide a good indication of when the data processing apparatus is nearing operating region limits.

In some embodiments, said performance control circuitry is configured to monitor usage of at least one predetermined power hungry component within said data processing apparatus, said performance control circuitry determining that operation is close to said operating region limits in response to detecting said at least one predefined power hungry component powering up.

In some data processing apparatus there are certain components that are particularly power hungry and these powering up may well move the current operating point of the data processing apparatus towards the limit of the desired operating region. Thus, one simply way of determining that the data processing apparatus is probably nearing the edge of the operating region is to monitor these components powering up.

In some embodiments, said performance control circuitry is configured in response to determining that said data processing apparatus is operating close to said operating region limits to limit a number of instructions that are issued speculatively to a processing pipeline.

If the performance control circuitry determines that the data processing apparatus is operating close to the operating region limits it may limit the number of instructions that are issued speculatively to a processing pipeline. The speculative execution of instructions requires that certain data is retained such that if the speculation is wrong the instructions can be replayed. If an error occurs during speculative execution then the number of instructions that need to be replayed may be high. Where there is an increased risk of errors then there is an increased risk of having to reply speculative instructions and it may be sensible to limit speculation as the benefits derived from it may be significantly reduced if a lot of replay is required.

In some embodiments, said performance control circuitry is configured to limit said number of instructions that are issued speculatively to a processing pipeline to zero such that no speculative execution of instructions is performed.

It may be advantageous to stop speculation completely where error rate is assumed to be high. This not only avoids the need to reply a lot of instructions if an error occurs, but speculation can be quite power hungry and thus, not allowing any speculation will reduce the power consumption of the data processing apparatus and may make it move away from the operating region limits and reduce errors generated.

In some embodiments, said data processing apparatus comprises a branch prediction unit for performing branch prediction, said performance control circuitry being configured in response to determining that said data processing apparatus is operating close to said operating region limits to turn said branch prediction unit off such that no branch prediction is performed.

Branch prediction is an example of speculation that is relatively power hungry and has timing critical paths within it. Thus, it may be advantageous to simply stop branch prediction when operating within an increased error rate.

In some embodiments, said data processing apparatus comprises a branch prediction unit for performing branch prediction, said performance control circuitry being configured in response to determining that said data processing apparatus is operating close to said operating region limit to select branch prediction paths within said branch prediction unit that are not timing critical and not select timing critical branch prediction paths.

Alternatively, rather than turning the branch prediction unit off one can select branch prediction that is less timing critical. Branch prediction units often use several alternative algorithms selecting an algorithm that provides the best prediction for a particular section of code. Some of these algorithms have timing critical paths within them and thus, where the data processing apparatus is operating close to the limits of the operating region it may be advantageous to simply restrict the selection to the non-timing critical algorithms.

In some embodiments, said data processing apparatus comprises a plurality of registers and register renaming circuitry for mapping architectural registers specified by instructions to said plurality of registers; wherein in response to determining that said data processing apparatus is operating close to said operating region limits, said performance monitoring circuitry is configured to select a subset of said plurality of registers for use by said register renaming circuitry and to limit renaming to said subset of registers.

In register renaming some registers may be more remote and take longer to access. Thus, it may be advantageous to limit the registers used in register renaming to those that are quicker to access. This means that fewer registers are available for the renaming but this may be acceptable, particularly if speculation is limited and it should reduce timing errors in the data accessing paths.

In some embodiments, said performance control circuitry is configured to delay processing of a task that requires a timing critical processing path or circuitry where processing allows, when it has determined that said data processing apparatus is operating close to said operating region limits.

An alternative possibility may be to delay processing of tasks where this is possible and the tasks use a timing critical processing path or circuitry. Alternatively, it may be possible to sub-divide timing critical tasks into plural less timing critical tasks prior to issuing said tasks to the processing pipeline and this may be desirable when operating close to the limits of the operating region as although the sub-divided tasks may take longer, they are less likely to generate errors. Thus, in an error prone region of operation this may be the most efficient way to proceed.

In some embodiments, said data processing apparatus comprises a processing pipeline and a prefetch unit for speculatively fetching instructions in advance for later issue to said processing pipeline, said performance control circuitry being configured to inhibit said prefetch unit from speculatively fetching instructions in response to determining that said data processing apparatus is operating close to said operating region limits.

Speculatively fetching instructions provides a performance improvement provided the speculation is often correct. However, it is a fairly power hungry operation and where the processing apparatus is operating close to its limits and error rates are raised it may be advantageous to inhibit the prefetch unit from speculatively fetching instructions. The processing apparatus will still be able to operate, the power consumption will be reduced and the processing apparatus may therefore move away from its operating region limits and back into a more preferred operating region.

A second aspect provides a method of processing data using a data processing apparatus configured to operate in a voltage and frequency operating region that is located beyond a safe region where errors do not arise, but within operating region limits such that said errors are rare, said data processing apparatus comprising: error detection circuitry and error recovery circuitry; said error detection circuitry being configured to determine if a signal sampled in said processing apparatus changes within a time window occurring after said signal has been sampled and during a same clock cycle as said sampling and to signal an error if said signal does change; said method comprising the steps of: determining when said data processing apparatus is operating close to said operating region limits; in response to determining operation close to said operating region limits modifying a behaviour of said data processing apparatus by at least one of: limiting speculative processing, and selecting timing insensitive processing paths and circuitry.

A third aspect provides a data processing means for processing data, said data processing means being configured to operate in a voltage and frequency operating region that is located beyond a safe region where errors do not arise, but within operating region limits such that said errors are rare, said data processing means comprising: error detection means for detecting errors and error recovery means for recovering from said detected errors; said error detection means being for determining if a signal sampled in said processing apparatus changes within a time window occurring after said signal has been sampled and during a same clock cycle as said sampling and signalling an error if said signal does change; said data processing means further comprising performance control means for determining when said data processing means is operating close to said operating region limits such that an error rate is raised and in response to determining operation close to said operating region limits modifying a behaviour of said data processing means by at least one of: limiting speculative processing, and selecting timing insensitive processing paths and circuitry.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

Figure 1:
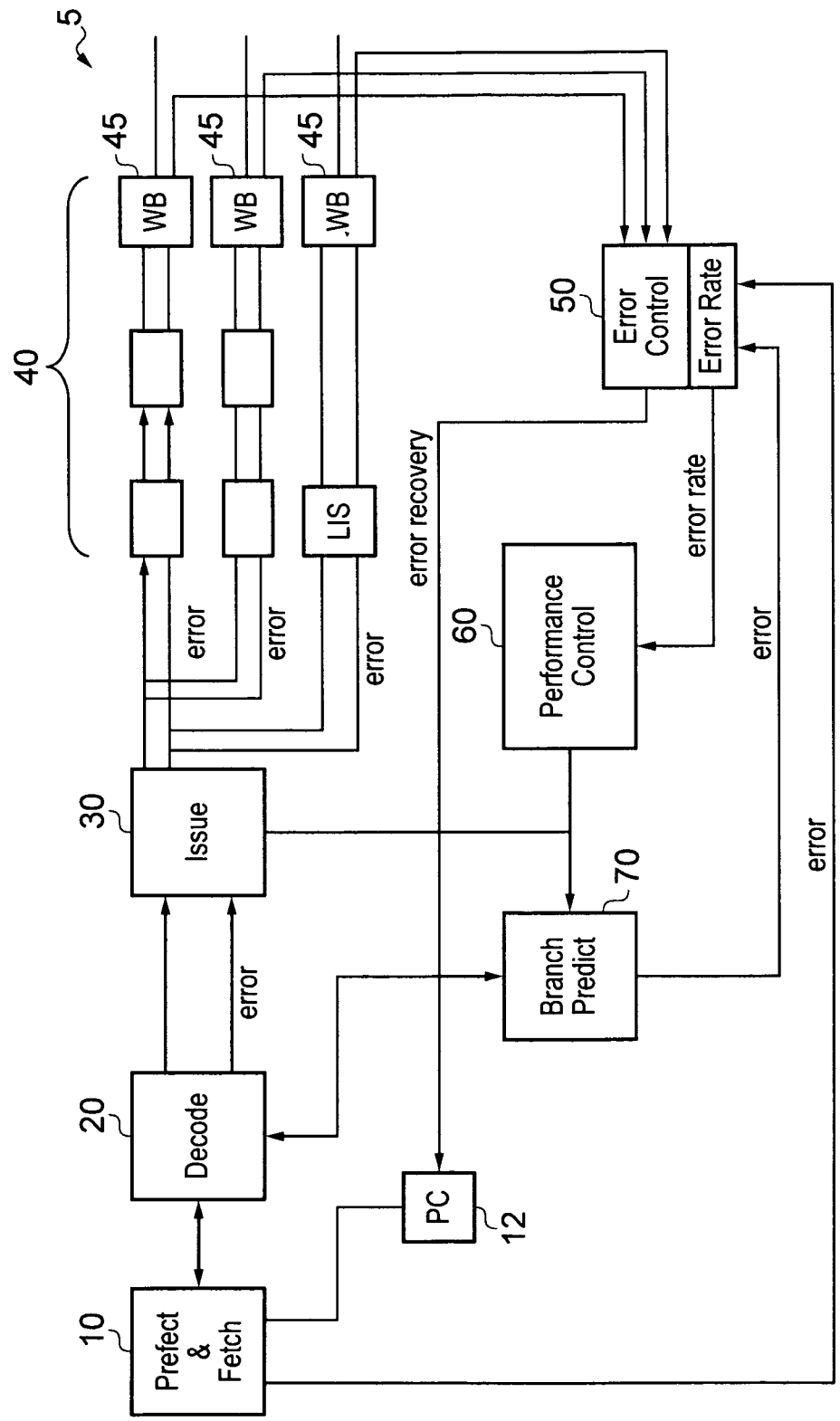
FIG. 1 shows a data processing apparatus according to an embodiment of the present invention.

FIG. 1 shows a data processing apparatus 5 having a pipeline including a pre-fetch and fetch unit 10, a decode unit 20, an issue unit 30 and an execution stage 40 and writeback stage 45.

This processing pipeline operates under the razor scheme and thus, errors are detected as they travel through the pipeline and are output to error control circuitry 50 along with the instruction that generated the error at one end of the pipeline.

The data processing apparatus has performance control circuitry 60 that in this embodiment monitors the error rate and if the error rate rises above a predetermined level it controls certain elements of the data processing apparatus in order to limit both error recovery costs and error rates.

Error control circuitry 50 receives error signals that are generated within the pipeline and sends an error recovery signal in response to each received error signal such that the instruction that generated the error is replayed by resetting program counter PC 12. The error control circuitry 50 will also receive error signals from branch predict unit 70 and from the prefetch unit 10. These errors are errors that occur in non-critical parts of the processing apparatus, such that these errors will not cause the processing apparatus to fail but will simply limit performance. Thus, these errors do not need to be corrected for but their rate is counted by error control circuitry 50 as it is an indication of how close to the limits of the operating region the data processing apparatus is operating at. In this regard, a data processing apparatus will generally generate fewer errors if the operating voltage is high the operating frequency low and the temperature low. A measure of the rate that errors are produced is a measure of how close to operating region limits the data processing apparatus is operating at. As this data processing apparatus 5 has error control circuitry 50 that allows it to recover from errors it will be designed to operate in a region where errors may occur but are rare. This allows the voltage to be lower and the frequency to be higher than in a conventional safe mode of operation but the operating region does need to be limited so that error rate does not rise too high whereupon recovery from these errors will become overly expensive.

Figure 2:
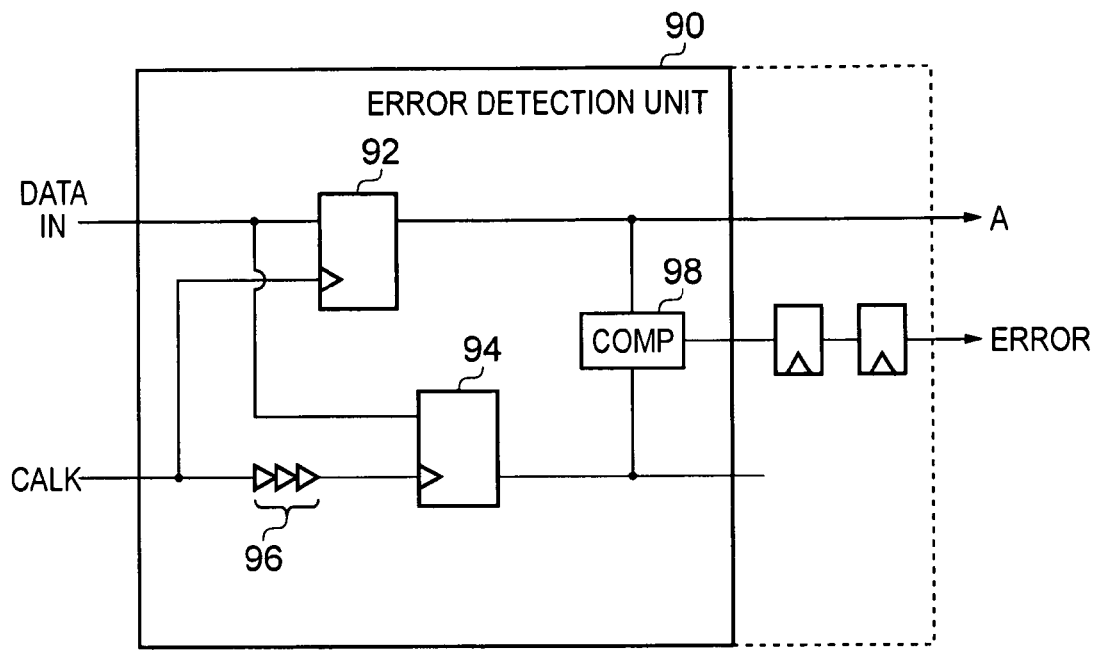
FIG. 2 shows error detection circuitry used within the data processing apparatus.
Figure 2:
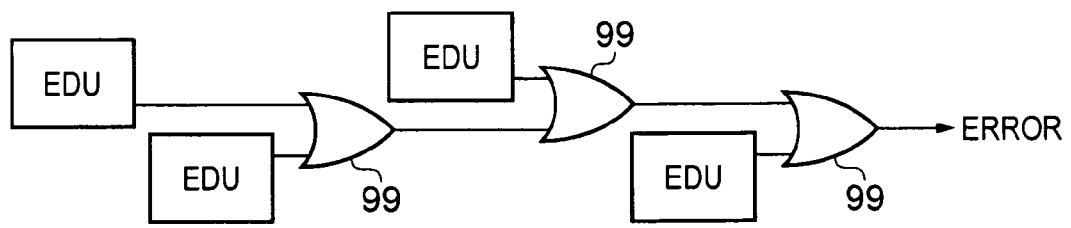

FIG. 2 shows example error detection units that are associated with each sampling point in a pipeline. Thus, the signal is sampled at latch 92 and is sampled at latch 94 a short time later, the delay being dependent on delay circuitry 96. Comparator 98 compares the two signals and where they are different generates an error signal. As the error signal is a timing error it may be metastable and thus, is latched twice before being sent further. The error signals from each sampling stage are combined using OR gates 99, such that if any sampling stage in a pipeline generates an error in response to an instruction this will be signalled as an error for that instruction.

Figure 3:
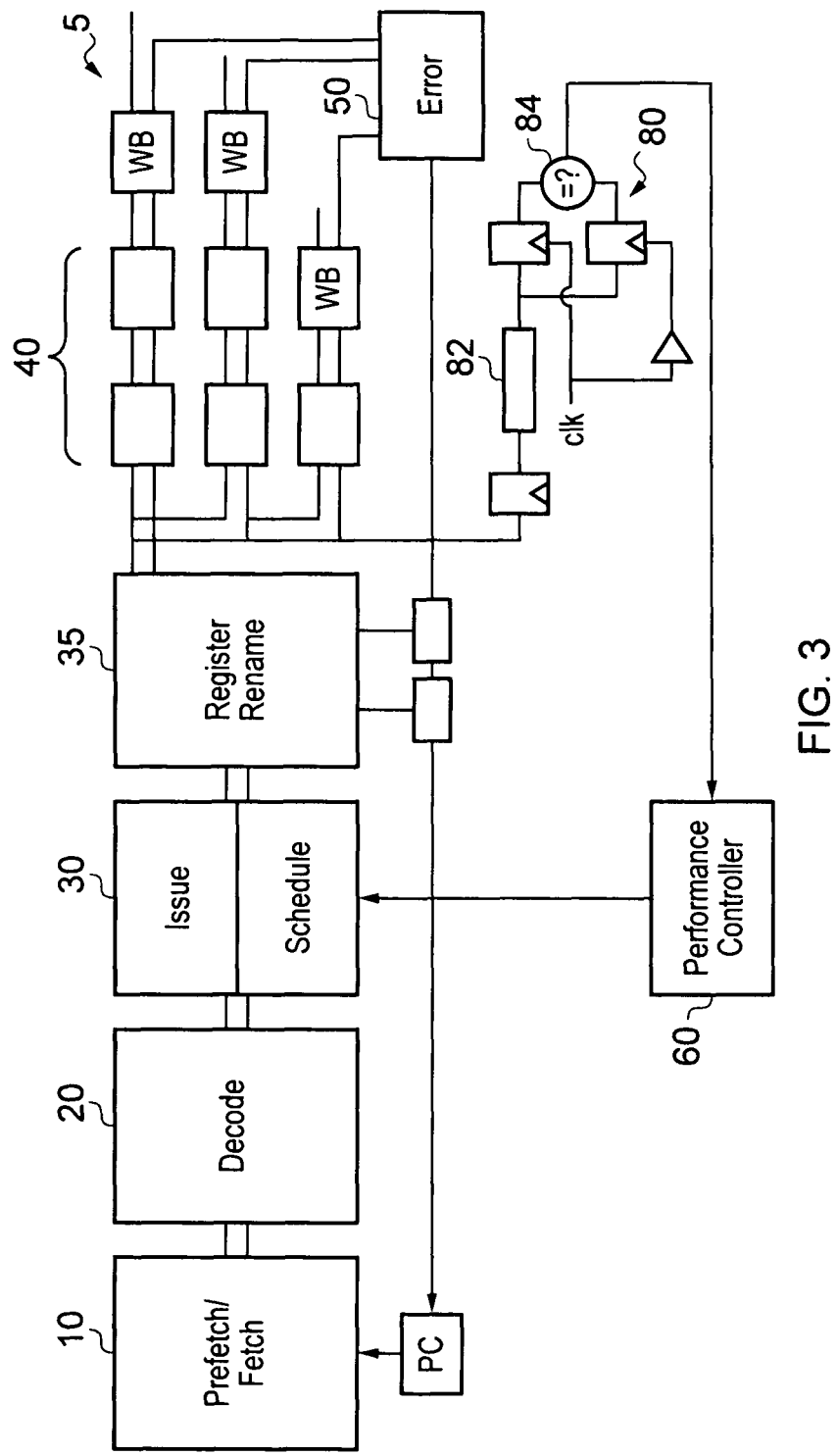
FIG. 3 shows an alternative embodiment of a data processing apparatus.

FIG. 3 shows an alternative data processing apparatus 5 according to an alternative embodiment. As for the apparatus in FIG. 1 there is a processing pipeline and performance controller 60. In this embodiment performance controller 60 receives a signal from a replica critical path 80. Replica critical path 80 is built to imitate critical paths within the processing pipeline. Thus, if a timing error occurs in this replica critical path such that a signal does not pass through the logic 82 within the clock cycle as is detected by comparator 84 then one can assume that signals passing through the real critical paths within the processing apparatus 5 may also not make the timing constraints. Thus, when this occurs a signal is sent to performance controller 60 which sends a control signal to the scheduler which is associated with the issue stage 30 of the processing pipeline. The scheduler will look at the decoded instructions and will delay timing critical functions where this is possible. It may also look to see where processing tasks that are timing critical and use timing critical circuitry can be divided into smaller tasks that are less timing critical. Where this is the case it will divide the tasks as required and thus, tasks that are less likely to fail when operating towards the limits of the desired operating region will be sent to the execution pipeline 40 via register renaming circuitry 35.

Figure 4:
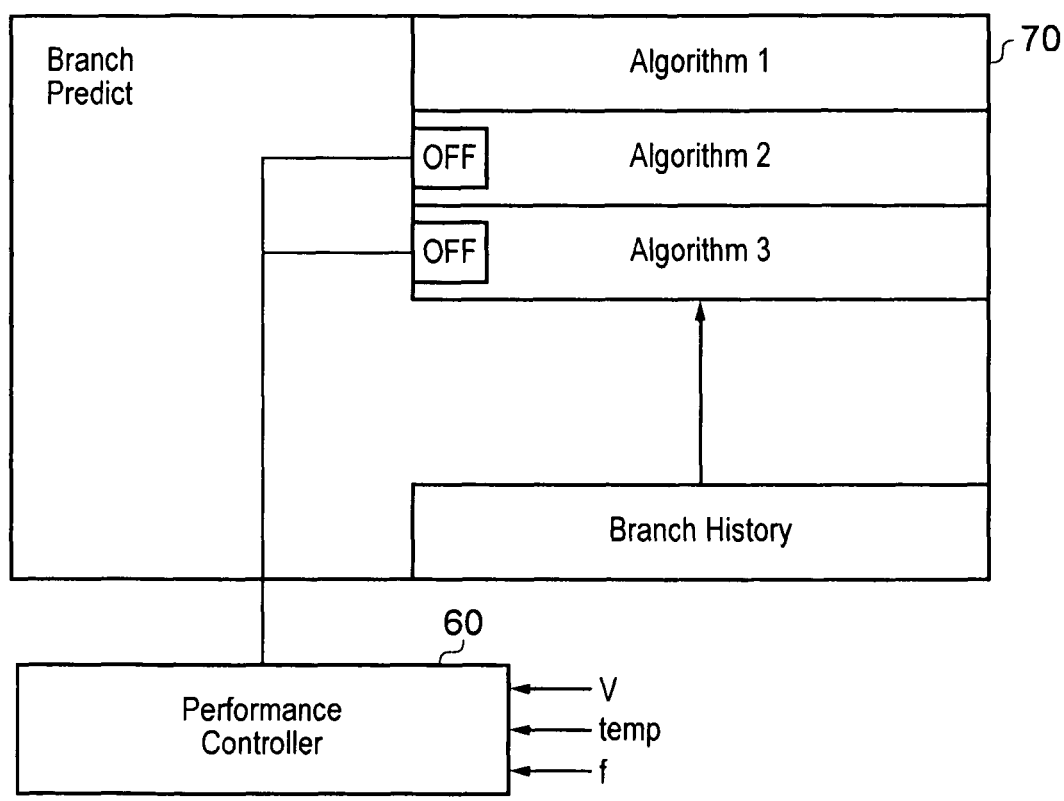
FIG. 4 shows a branch predict unit controlled by a performance controller.

FIG. 4 schematically shows an example of a branch predictor such as is shown as 70 in FIG. 1. Branch predictor 70 has three possible algorithms it can use to predict whether a branch is taken or not. The algorithm to be used is selected depending upon the code currently being processed and the detected success of that particular algorithm that is known using feedback signals. Each of the algorithms will use branch history information which stores data regarding previous branches. Some of the algorithms may take longer to perform than others and thus, are more timing critical. Thus, in some embodiments, performance monitor 60 may chose to turn off the more timing critical algorithms when it detects that the data processing apparatus is operating close to a limit of the operating region. In this embodiment performance controller 60 determines this from the current voltage, frequency and temperature of the data processing apparatus. When it determines it is near a limit of the region where error rates are rising then it may turn off the more timing critical algorithms and the branch prediction unit will then use the less timing critical algorithm. In other embodiments, the performance controller 60 may simply turn off the branch prediction unit and no prediction will be used during operation close to the limits of the operating region. An advantage of this is there is less speculation and therefore fewer instructions to replay following an error and also less power is consumed and thus, the operating point of the data processing apparatus may move away from the limits of the operating region and into a more desirable operating region.

Figure 5:
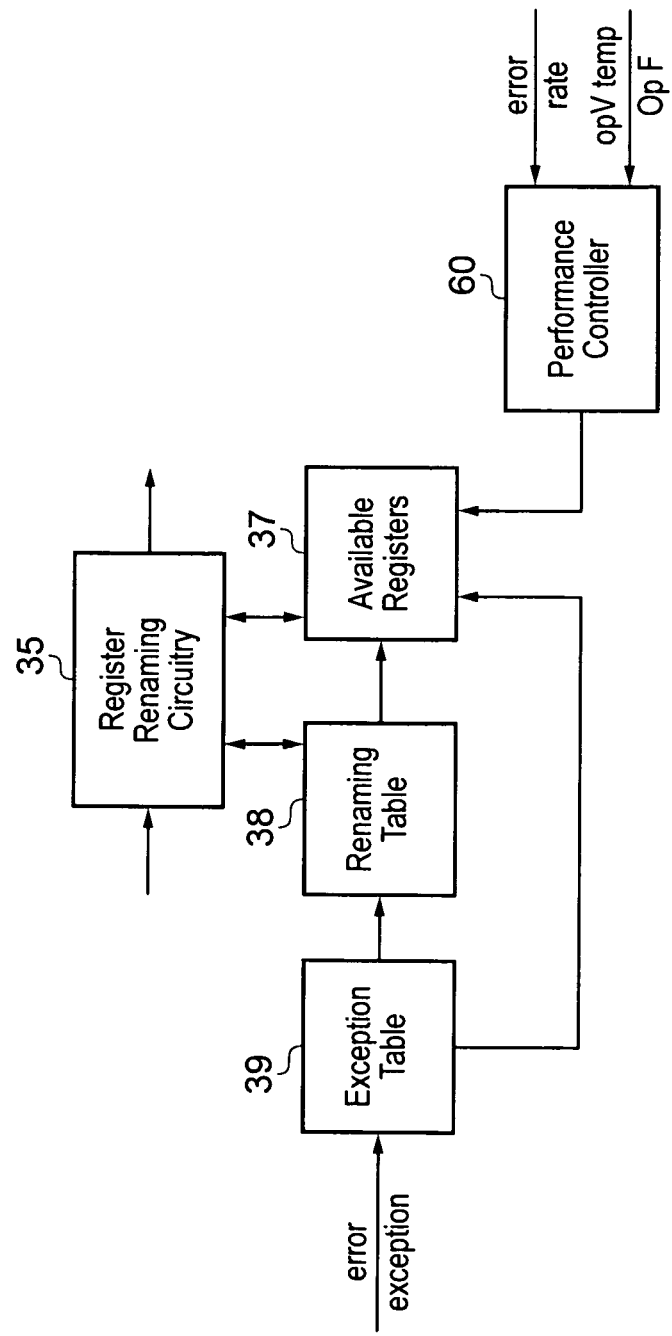
FIG. 5 shows register renaming circuitry controlled by a performance controller.

FIG. 5 shows register renaming circuitry 35 in more detail. The register renaming circuitry receives the instructions and where the instruction updates a register the register renaming circuitry 35 will rename the architectural register to a physical register that is present in data processing apparatus 5. It will do this by selecting a physical register from a table of available registers 37 and it will store the result of the renaming in the renaming table 38. There is also an exception table 39 which stores the register mapping for any pending speculative instructions along with the previous register mapping for the architectural register, such that if the speculative instruction does not complete the previous renaming values can be retrieved. As this is a razor system where errors may occur all instructions can be viewed as speculative and thus all pending instructions are stored in exception table 39 until it can be determined that they have completed without generating an error or an exception.

In this embodiment, performance controller 60 will determine either from the error rate or from the operating voltage frequency and temperature when the data processing apparatus is operating in a region close to its limits such that an error rate is raised and it will then send a signal to register renaming circuitry 35 which will cause the amount of available registers in available register table 37 to be limited to the most easily accessible registers. Thus, registers that take longer to access will not be used when operating close to the operating region limits.

Figure 6:
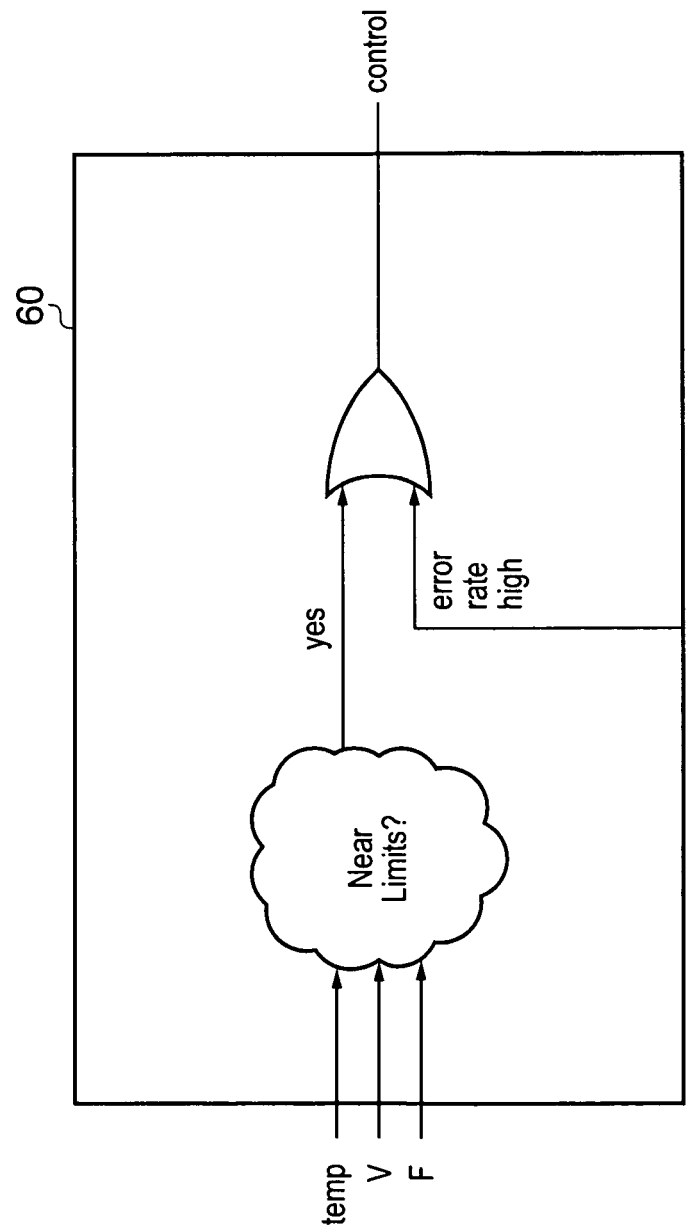
FIG. 6 shows schematically in performance controller according to an embodiment of the present invention.

FIG. 6 shows performance controller 60 according to an embodiment of the present invention. Performance controller 60 has logic 62 that receives indications of the current voltage, current temperature and current frequency of operation of the data processing apparatus and determines whether these are close to the limits of the operating region or not. It also receives an error rate from error controller 50 and if either of these signals indicate that the data processing apparatus is close to the limits of the desired operating region the performance controller 60 will generate a control signal that will be used to modify the behaviour of the data processing apparatus.

Figure 7:
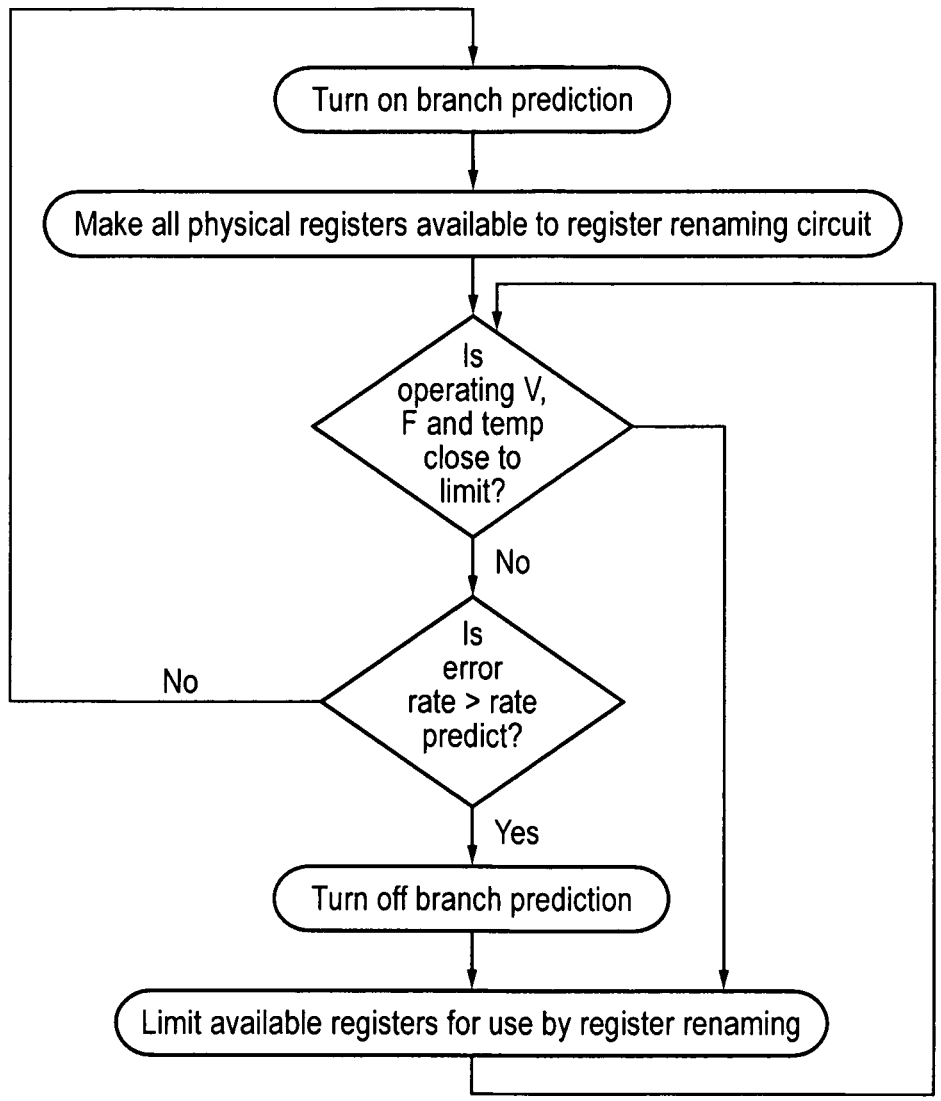
FIG. 7 shows a flow diagram illustrating steps in a method according to an embodiment of the present invention.
Figure 8:
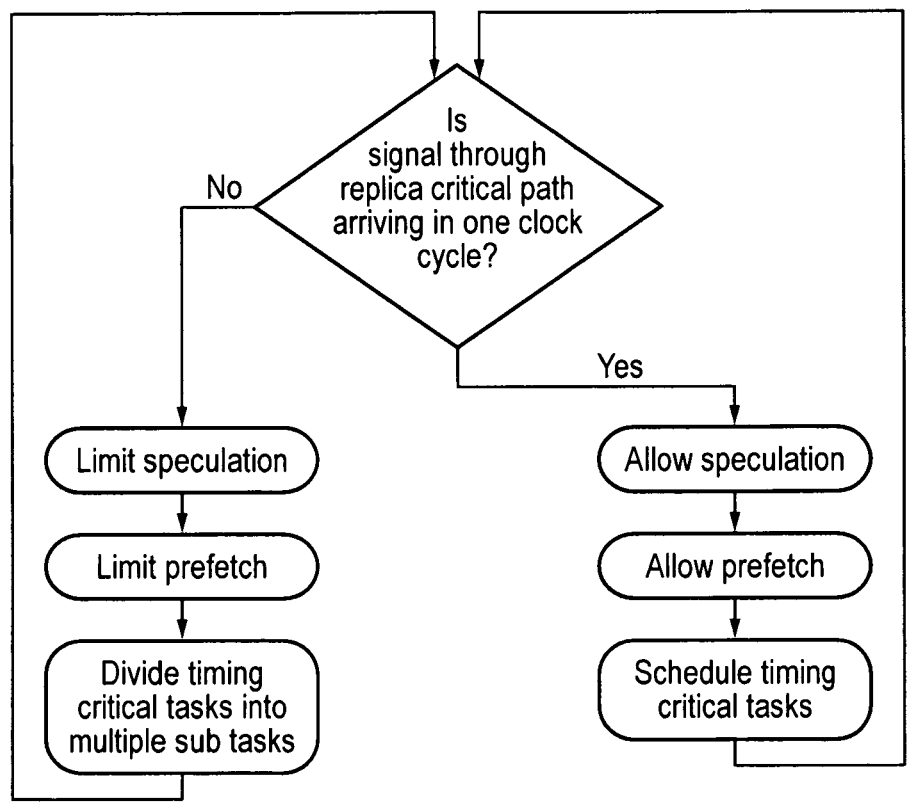
FIG. 8 shows a flow diagram illustrating steps in a method according to a further embodiment of the present invention

FIG. 7 shows a flow diagram illustrating steps in a method according to an embodiment of the present invention. Initially branch prediction is turned on and all physical registers are available to the register renaming circuit. The performance controller will then determine if the data processing apparatus is operating at a voltage, frequency and temperature that are close to the limits of the region. If it determines that it is not it will also look to see if the error rate generated by error controller 50 is greater than a predetermined value. If neither of these things are the case it will continue to have branch prediction turned on and continue to use all the registers for renaming. If however either of the error rate or the operating conditions indicate that the data processing apparatus is operating close to the limits of the operating region then branch prediction will be turned off and the registers available for use by register renaming will be limited.

In an alternative method shown in FIG. 7 the performance controller monitors a replica critical path and determines whether the signal through this path arrives in one clock cycle. If it does then it will allow the data processing apparatus to speculate, it will allow prefetch and it will schedule timing critical tasks. If however it determines that the signal through the replica critical path is not arriving in a single clock cycle then it will limit speculation, limit prefetch and divide timing critical paths into multiple sub-tasks. In this way, it will reduce the error rate and reduce the cost of error recovery. It will also reduce the power consumed by the data processing apparatus and therefore help it to move away from the limit of the region and back into a more preferred operating space.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. A data processing apparatus for processing data, said data processing apparatus being configured to operate in a voltage and frequency operating region that is located beyond a safe region where errors do not arise, but within operating region limits such that said errors are rare, said data processing apparatus comprising:

error detection circuitry and error recovery circuitry;

said error detection circuitry being configured to determine if a signal sampled in said processing apparatus changes within a time window occurring after said signal to has been sampled and during a same clock cycle as said sampling and to signal an error if said signal does change;

said data processing apparatus comprising performance control circuitry configured to determine when said data processing apparatus is operating close to said operating region limits where an error rate is raised and in response to determining operation close to said operating region limits to modify a behaviour of said data processing apparatus by at least one of: limiting speculative processing, and selecting timing insensitive processing paths and circuitry.

2. A data processing apparatus according to claim 1, comprising an error controller configured to receive error signals from said error detection circuitry indicating that an error has been detected, said error controller being configured to determine when a rate of detected errors rises above a predetermined value and to signal an increased error rate to said performance control circuitry, said performance control circuitry determining that said data processing apparatus is operating close to said operating region limits in response to receiving said increased error rate signal.

3. A data processing apparatus according to claim 2, wherein said error detection circuitry is configured to detect errors in signals on processing critical paths and on non-critical performance improvement paths and to transmit said error signals to said error controller, said error recovery circuitry being configured to perform error recovery only in response to said error signals on said processing critical paths, and said error controller being configured to count all detected error signals when determining said error rate.

4. A data processing apparatus according claim 1, said performance control circuitry being configured to monitor an operating frequency, current temperature and operating voltage of said data processing apparatus and to determine that said data processing apparatus is operating close to said operating region limits in response to detecting a current operating frequency, temperature and voltage that are close to said operating frequency, temperature and voltage of said operating region limits.

5. A data processing apparatus according to claim 1, said performance control circuitry being configured to monitor a replica critical path and to determine from a timing of a signal along said replica critical path when said data processing apparatus is operating close to said operating region limits.

6. A data processing apparatus according to claim 1, said performance control circuitry being configured to monitor usage of at least one predetermined power hungry component within said data processing apparatus said performance control circuitry determining that operation is close to said operating region limits in response to detecting said at least one predefined power hungry component powering up.

7. A data processing apparatus according to claim 1, wherein said performance control circuitry is configured in response to determining that said data processing apparatus is operating close to said operating region limits to limit a number of instructions that are issued speculatively to a processing pipeline.

8. A data processing apparatus according to claim 7, wherein said performance control circuitry is configured to limit said number of instructions that are issued speculatively to a processing pipeline to zero such that no speculative execution of instructions is performed.

9. A data processing apparatus according to claim 1, wherein said data processing apparatus comprises a branch prediction unit for performing branch prediction, said performance control circuitry being configured in response to determining that said data processing apparatus is operating close to said operating region limits to turn said branch prediction unit off such that no branch prediction is performed.

10. A data processing apparatus according to claim 1, wherein said data processing apparatus comprises a branch prediction unit for performing branch prediction, said performance control circuitry being configured in response to determining that said data processing apparatus is operating close to said operating region limits to select branch prediction paths within said branch prediction unit that are not timing critical and not select timing critical branch prediction paths.

11. A data processing apparatus according to claim 1, said data processing apparatus comprising a plurality of registers and register renaming circuitry for mapping architectural registers specified by instructions to said plurality of registers; wherein in response to determining that said data processing apparatus is operating close to said operating region limits, said performance monitoring circuitry is configured to select a subset of said plurality of registers for use by said register renaming circuitry and to limit renaming to said subset of registers.

12. A data processing apparatus according to claim 1, wherein said performance control circuitry is configured to delay processing of a task that requires a timing critical processing path or circuitry where processing allows, when it has determined that said data processing apparatus is operating close to said operating region limits.

13. A data processing apparatus according to claim 12, said data processing apparatus comprising a processing pipeline and scheduling circuitry for issuing tasks to said processing pipeline, said scheduling circuitry being configured in response to receiving a signal from said performance control circuitry indicating said data processing apparatus is operating close to said operating regions limits to subdivide timing critical tasks into plural tasks prior to issuing said tasks to said processing pipeline.

14. A data processing apparatus according to claim 1, said data processing apparatus comprising a processing pipeline and a prefetch unit for speculatively fetching instructions in advance for later issue to said processing pipeline, said performance control circuitry being configured to inhibit said prefetch unit from speculatively fetching instructions in response to determining that said data processing apparatus is operating close to said operating region limits.

15. A method of processing data using a data processing apparatus configured to operate in a voltage and frequency operating region that is located beyond a safe region where errors do not arise, but within operating region limits such that said errors are rare, said data processing apparatus comprising:

error detection circuitry and error recovery circuitry;

said error detection circuitry being configured to determine if a signal sampled in said processing apparatus changes within a time window occurring after said signal has been sampled and during a same clock cycle as said sampling and to signal an error if said signal does change;

said method comprising the steps of:

determining when said data processing apparatus is operating close to said operating region limits;

in response to determining operation close to said operating region limits modifying a behaviour of said data processing apparatus by at least one of: limiting speculative processing, and selecting timing insensitive processing paths and circuitry.

16. A method according to claim 15, wherein said step of determining when said data processing apparatus is operating close to said operating region limits comprises receiving error signals from said error detection circuitry indicating that an error has been detected and determining when a rate of detected errors rises above a predetermined value.

17. A method according to claim 15, wherein said step of modifying said behaviour of said data processing apparatus comprises limiting a number of instructions that are issued speculatively to a processing pipeline.

18. A method according to claim 15, wherein said step of modifying said behaviour of said data processing apparatus comprises turning a branch prediction unit off such that no branch prediction is performed.

19. A method according to claim 15, wherein said step of modifying said behaviour of said data processing apparatus comprises inhibiting a prefetch unit from speculatively fetching instructions.

20. A data processing means for processing data, said data processing means being configured to operate in a voltage and frequency operating region that is located beyond a safe region where errors do not arise, but within operating region limits such that said errors are rare, said data processing means comprising:

error detection means for detecting errors and error recovery means for recovering from said detected errors;

said error detection means being for determining if a signal sampled in said processing apparatus changes within a time window occurring after said signal has been sampled and during a same clock cycle as said sampling and signaling an error if said signal does change;

said data processing means further comprising performance control means for determining when said data processing means is operating close to said operating region limits such that an error rate is raised and in response to determining operation close to said operating region limits modifying a behaviour of said data processing means by at least one of limiting speculative processing, and selecting timing insensitive processing paths and circuitry.

* * * * *